June 10, 1969 G. A. KENT ET AL 3,449,514

TELEVISION RECEIVER VIDEO DRIVER CIRCUIT

Filed June 24, 1966

INVENTOR.
George A. Kent
BY Richard J. Waring
Pendleton, Neuman,
Seibold & Williams
Attorneys United States Patent Office 3,449,514
Patented June 10, 1969

1 2

3,449,514
TELEVISION RECEIVER VIDEO DRIVER CIRCUIT

George A. Kent, Fort Wayne, and Richard J. Waring, Auburn, Ind., assignors to The Magnavox Company, Fort Wayne, Ind., a corporation of Delaware Filed June 24, 1966, Ser. No. 560,261
Int. Cl. H04n *3/16, 5/44;* H03b *3/04*
U.S. Cl. 178—7.5 7 Claims

ABSTRACT OF THE DISCLOSURE

A multifunction television video driver circuit is disclosed which has a sufficiently high input impedance to avoid overloading the video detector coupled to its input and a sufficiently low output impedance that the sound IF, synchronization signal separator, AGC, and video output stages may all be driven from it. A reference level is applied to one of the detector output terminals so that the synchronization pulses will drive the video driver almost to saturation thus making it act as a noise clipper. Additionally, part of the bias current of the circuit is applied to the detector diode thus varying its bias level to minimize detector white clipping under various conditions of driver gain and loading.

Figure 1:
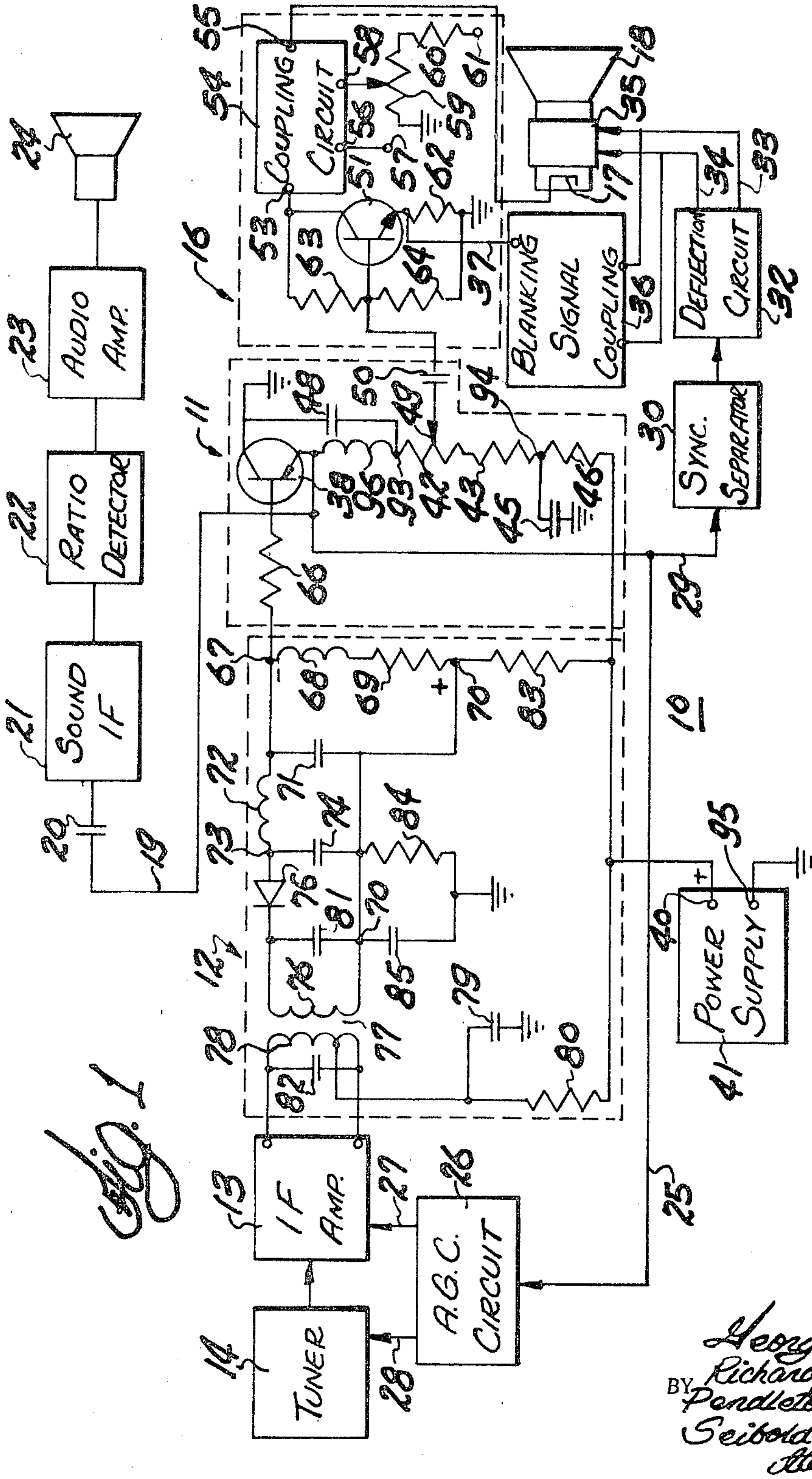

This invention relates to a television receiver video driver circuit and more particularly to a video driver circuit which is effective to perform a plurality of functions in a highly effective and reliable manner while using a minimum number of components and while being readily and economically manufacturable. The circuit is operative to minimize noise components and also permits an accurate and stable control of picture contrast while maintaining excellent frequency response characteristics, so as to produce a picture of very high quality.

In conventional television receiver circuits, a received signal in the form of an RF signal, modulated by a video signal and by a subcarrier which is modulated by an audio signal, is converted to an IF signal which is amplified and applied to a video detector. The video detector operates to demodulate the modulated signal to develop a video signal and also to develop an audio-modulated subcarrier signal. The signal so developed by the video detector is applied through an amplifier to the electron gun structure of the picture tube to control the brightness of the scanning spot produced on the picture tube screen. The signal from the video detector is also applied to a synchronizing signal separator circuit which develops signals applied to deflection circuitry to control the deflection of the electron beam in synchronism with horizontal and vertical synchronizing components of the video signal. The output of the detector circuit is also generally applied to an automatic gain control circuit which supplies a control voltage to variable-gain amplifier stages, to maintain the amplitude of the video signal substantially constant. The output of the detector is additionally applied to a sound IF amplifier, operative to apply the audio-modulated subcarrier to a detector circuit which functions to develop an audio signal which is amplified and applied to a sound reproducer.

In prior circuits, the application of the detector output signal to the various circuits has presented various coupling problems, resulting in poor performance in many cases, and has required additional components, more complex circuitry and additional manufacturing expense. An additional difficulty with prior circuits has arisen from the application of noise signal components to the electron gun structure of the picture tube, resulting in distortions of the picture. Further, the prior circuits have not usually been effective to permit satisfactory control of contrast without having non-uniform frequency response characteristics. As a result, the picture quality has not been high.

This invention was evolved with the object of overcoming the disadvantages of prior art circuits and of providing a video driver circuit having a minimum number of components but being effective to perform the required plurality of functions in a highly reliable and effective manner.

Another object of the invention is to provide a circuit which is operative to minimize noise components so as to minimize picture distortions.

A further object of the invention is to provide a circuit which permits accurate and stable control of picture contrast while having uniform frequency response characteristics, to produce a picture of high quality.

According to this invention, a video driver stage is provided having an input connected to the output of a video detector circuit and including a transistor operated as an emitter-follower to present a relatively high input impedance to the detector circuit while having a relatively low output impedance. With this arrangement, the loading of the video detector circuit is minimized and optimum performance thereof is obtained.

In accordance with an important feature of the invention, the output of the video driver stage is aplied to the input of a video output stage having an output coupled to the electron gun structure of a picture tube, the video output stage preferably including a transistor having a base coupled to the output of the driver stage and having a collector coupled to the electron gun structure. With this arrangement and with the low impedance output characteristics of the driver stage, it is possible to obtain high picture quality.

Another important feature of the invention is in the provision of a contrast-control potentiometer in the emitter circuit of the transistor of the driver stage. This feature permits an accurate and stable control of contrast and, contrary to the results obtained with conventional circuits, does not alter the frequency response characteristics, so as to obtain very high picture quality in all positions of adjustment of the contrast-control potentiometer.

A further feature of the invention is in the coupling of a synchronizing signal separator circuit to the output of the video driver stage, this feature being possible because of the low output impedance of the video driver stage.

Still another feature of the invention is in the coupling of the input of a sound IF amplifier to the output of the driver stage, which is also made possible by the low output impedance of the driver stage.

An additional feature which is possible because of the low output impedance of the driver stage is the coupling of the output thereof to the input of an automatic gain control circuit.

A specific feature of the invention is in the application of the video signal from the video detector circuit to the base electrode of the transistor of the driver stage with a polarity such that the synchronizing pulse portions of the video signal increase conduction of the transistor. Preferably, reference level means are effective to fix the level of the video detector output in a manner such that the synchronizing pulse portions drive the transistor of the driver stage to a point close to saturation. With this feature, noise signals are effectively clipped, resulting in a further increase in picture quality.

The provision of the reference level means, effective to permit noise clipping, is particularly advantageous in combination with the automatic gain control circuit coupled to the driver stage output, in that the amplitude of the video signal applied to the driver stage can be maintained substantially constant, so as to permit more effective noise clipping.

A still further feature of the invention is in the use of a detector circuit having a diode connected in series with a signal-supplying transformer winding between detector output terminals with a load resistor connected between the output terminals, and with such output terminals connected between the base electrode of the driver and a reference potential source. With this arrangement, the base bias current flows through the detector load resistor.

Preferably, and in accordance with still another feature of the invention, the diode of the detector is connected in a direction such that base bias current of the driver transistor flows in parallel paths through the diode and through the detector load resistor. With this feature, the component of the bias current which flows in the detector diode is a function of the gain of the video driver transistor and of its emitter load, to automatically compensate for variations in gain and load and to minimize detector white clipping under all conditions.

Figure 2:
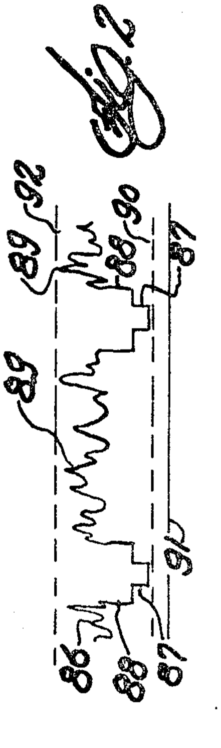

This invention contemplates other and more specific objects, features and advantages which will become more fully apparent from the following detailed description taken in conjunction with the accompanying drawings which illustrate a preferred embodiment and in which:

FIGURE 1 is a circuit and schematic block diagram of a television receiver constructed in accordance with the principles of this invention; and FIGURE 2 is a view showing a waveform for explanation of the operation of the circuit shown in FIGURE 1.

Reference numeral 10 generally designates a television receiver constructed in accordance with the principles of this invention. Important features of the invention resides in a video driver circuit 11 to which a video signal is applied from a video detector circuit 12. The video detector circuit 12 is supplied with a modulated signal from an IF amplifier 13 to which a signal is applied from a conventional tuner 14.

The video driver circuit 11 supplies an output signal through a video output stage 16 to a cathode 17 forming part of the electron gun structure of a picture tube 18, to control the brightness of a scanning spot in accordance with the instantaneous magnitude of the video signal.

In accordance with an important feature of the invention, an output signal from the video driver circuit 11 is applied through a line 19 and a coupling capacitor 20 to a sound IF amplifier stage 21. The output of the sound IF amplifier stage 21 is applied to a ratio detector 22 which develops an audio signal, applied through an audio amplifier 23 to a speaker or sound reproducer 24.

A further feature of the invention is in the application of an output signal from the video driver circuit 11 through a line 25 to an automatic gain control circuit 26, which operates to supply control voltages on lines 27 and 28 to the IF amplifier 13 and the tuner 14, to automatically maintain the amplitude of the detected video signal substantially constant.

Still another feature of the invention is in the application of a signal from the output of the video driver circuit 11 through a line 29 to a synchronizing signal separator circuit 30 which applies a signal to a deflection circuit 32 which operates to supply horizontal and vertical sweep signals through lines 33 and 34 to a deflection coil assembly 35 of the picture tube 18.

A blanking signal coupling circuit 36 may be provided having input terminals connected to the lines 33 and 34 and having an output terminal connected through a line 37 to the video output stage 16. The blanking signal coupling circuit 36 is not part of the present invention, by itself, but is incorporated in a complete receiver constructed according to the invention and is shown for the sake of completeness. The other circuits shown in block form are either available in published information, or can use conventional circuitry, and are therefore not illustrated in detail.

The video driver circuit 11 comprises a transistor 38 which is operated as an emitter-follower to present a relatively high impedance to the detector circuit 12 while having a relatively low output impedance, so to make it possible to directly couple the output signal to the video output stage 16, the sound IF amplifier 21, the automatic gain control circuit 26 and the synchronizing signal separator circuit 30. The collector of the transistor 38 is connected directly to ground while the emitter thereof is connected through load impedance means to an output terminal 40 of a power supply 41 having a second output terminal 95 connected to ground. The load impedance means comprises an inductor 96 connected between the emitter of transistor 38 and one end of a contrast-control potentiometer 42, the other end of which is connected through a capacitor 45 to ground and through a resistor 46 to the power supply terminal 40. The capacitor 45 and resistor 46 operate as a decoupling filter. The junction between the inductor 96 and the potentiometer 42 is connected to ground through a capacitor 48 which cooperates with the inductor 96 in removing IF frequency components.

The provision of the contrast-control potentiometer 42 in the emitter circuit of the transistor 38 is an important feature of the invention. A movable contact 49 of the potentiometer 42 is connected through a capacitor 50 to the base electrode of a transistor 51 in the video output circuit 16. The collector of the transistor 51 is connected to a terminal 53 of a coupling circuit 54 having a second terminal 55 which is connected to the cathode 17 of the picture tube 18. A third terminal 56 is connected to a terminal 57 which is connected to a power supply for application of supply voltage to the transistor 51. A fourth terminal 58 is connected to the movable contact of a potentiometer 59 having one terminal connected to ground and having a second terminal connected through a resistor 60 to a terminal 61, to which a voltage is applied from a power supply. The potentiometer 59 controls the level of DC voltage at the cathode 17 of the picture tube 18 and thereby controls brightness. The emitter of the transistor 51 is connected through a resistor 62 to ground and is also connected directly to the line 37 from the blanking signal coupling circuit 36. Retrace pulse portions of the horizontal and vertical deflection signals are applied on the line 37 to cut off the transistor 51 and to blank the picture tube 18. To provide proper bias for the transistor 51, the base thereof is connected through a resistor 63 to the collector thereof and is connected through a resistor 64 to ground.

With the collector of the output transistor 51 being coupled to the cathode 17 of the picture tube 18 and with the base of the transistor 51 being coupled through the capacitor 50 to the contact 49 of the low impedance contrast-control potentiometer 42, a video frequency response characteristic is obtained which remains substantially uniform in all positions of adjustment of the contact 49, which is very important in obtaining high picture quality.

The base electrode of the video driver transistor 38 is connected through a resistor 66 to a circuit point 67 which forms one output terminal of the video detector circuit 12. Circuit point 67 is connected through an inductor 68 and a resistor 69 to a circuit point 70 which forms a second output terminal of the video detector circuit 12. A capacitor 71 is connected between circuit points 67 and 70 and together with the inductor 68 and resistor 69 forms a load impedance for the detector circuit. To develop a video signal between circuit points 67 and 70, circuit point 67 is connected through an inductor 72 to a circuit point 73 which is connected through a capacitor 74 to the circuit point 70 and which is connected through a diode 75 to one terminal of a secondary winding 76 of a transformer 77, the other terminal of winding 76 being connected to the circuit point 70. The transformer 77 has a primary winding 78 connected to output terminals of the IF amplifier 13. A tap on the primary winding 78 may be connected through a capacitor 79 to ground and through a resistor 80 to the power supply terminal 40, to supply operating voltage for a transistor of the IF amplifier 13, not shown. Capacitors 81 and 82 are connected in parallel with the windings 76 and 78, to tune the same to resonance at the IF frequency. The video detector circuit operates in a manner which is known in the art, the diode 75 being effective to demodulate the modulated signal which is induced in the secondary winding 76, to produce a video signal between circuit points 67 and 70 having a polarity as indicated by the plus and minus signs on the drawing, the circuit point 70 being positive relative to the circuit point 67 in proportion to the video signal.

To provide operating bias for the driver transistor 38, the circuit point 70 is connected through a resistor 83 to the power supply terminal 40 and through a resistor 84 to ground, a by-pass capacitor 85 being connected across the resistor 84. With this arrangement, reference level means are provided which fix the potential of the circuit point 70 at a substantially constant level which is intermediate ground potential and the potential of the power supply terminal 40.

The reference level of the circuit point 70 in relation to the normal amplitude of the video signal between circuit points 70 and 67, and the polarity of the video signal, are important in obtaining optimum operation. In particular, the polarity of the video signal is preferably such that synchronizing pulse portions thereof increase conduction of the driver transistor 38, preferably with the level of the circuit point 70 being such that the synchronizing pulse portions drive the transistor 38 to a point close to saturation. With this arrangement, bursts of noise of a magnitude greater than normal video are effectively clipped by saturated transistor action.

This feature is illustrated in FIGURE 2, wherein reference numeral 86 generally designates a waveform showing the form of signal developed between circuit points 93 and 94, including synchronizing pulse portions 87 on blanking pedestals 88, with video information signal portions 89 between the blanking pedestals 88.

As shown, the tips of the synchronizing pulse portions 87 have a level, as indicated by dotted line 90 which is only slightly above ground potential, indicated by solid line 91.

It is noted that the illustrated waveform in FIGURE 2 is that obtained with the use of a PNP transistor as the transistor 38 of the driver circuit 11, in which case the power supply terminal 40 is positive relative to the grounded power supply terminal 95, the terminal 40 being preferably at plus 12 volts relative to ground, for example. It is possible, however, to use an NPN transistor with appropriate changes in the polarity of the power supply, in the direction of conduction of the diode 75, and in the application of the output signal to the picture tube. In either case, a silicon transistor is preferably used.

It is additionally noteworthy that the base bias current of the driver transistor 38 flows through the parallel combination of the video load resistor 69 and the detector diode 75 which is forward-biased. The component of the bias current which flows in the diode 75 is a function of the gain of the driver transistor 38 and of the load in the emitter circuit thereof. This feature provides automatic compensation for variations of gain and load to minimize detector white clipping under all conditions of operation.

By way of illustrative example and not by way of limitation, components of the illustrated circuit may have values according to the following table:

| Reference numeral: | | Value |
|---|---|---|
| **41** | microhenries | 4 |
| **42** | ohms | 600 |
| **43** | do | 100 |
| **45** | microfarads | 10 |
| **46** | ohms | 33 |
| **48** | micromicrofarads | 100 |
| **50** | microfarads | 4 |
| **62** | ohms | 100 |
| **63** | do | 220,000 |
| **64** | do | 10,000 |
| **68** | microhenries | 278 |
| **69** | ohms | 3,900 |
| **83** | do | 4,700 |
| **84** | do | 1,500 |

The video output transistor 51 and the video driver transistor 38 may be of a conventional type. With the power supply terminal 40 operated at plus 12 volts relative to ground, and with the above types and values of components, the emitter-follower driver transistor 38 presents an impedance of approximately 40,000 ohms to the detector circuit 12 so as to provide substantially no shunting action on the video load impedance between circuit points 67 and 70. At the same time, the output impedance at the emitter of the transistor 38 is less than 50 ohms which makes possible the direct connection thereof through the lines 19, 25 and 29 to the sound IF stage 21, the automatic gain control circuit 26 and the synchronizing signal separator circuit 30. The IF amplifier 13 and tuner 14 are so operated and controlled by the automatic gain control circuit 26 as to maintain a detected video signal between circuit points 93 and 94 having an amplitude of approximately 2.5 volts as measured from the tips of the synchronizing pulse portions, at dotted line 90 in FIGURE 2, to the maximum white portions of the video signal, indicated by dotted line 92 in FIGURE 2. Under such normal conditions, the tips of the synchronizing pulse portions are at a level as indicated by dotted line 90 in FIGURE 2, which is approximately 0.7 volt above ground, ground potential being indicated by line 91 in FIGURE 2. As above indicated, bursts of noise of a magnitude greater than normal video are effectively clipped by saturated transistor action.

It will be understood that modifications and variations may be effected without departing from the spirit and scope of the novel concepts of this invention.

We claim:

1. In a television receiver circuit, a video driver stage having an input, an output, and a transistor having collector, emitter and base electrodes, a video detector circuit coupled to said input including a pair of output terminals and being operative to supply a video signal having synchronizing pulse portions through one of said output terminals to said base electrode with a polarity such that said synchronizing pulse portions increase conduction of said transistor, a DC power supply having a pair of terminals, means connecting said collector electrode to one of said power supply terminals, load impedance means connecting said emitter electrode to the other of said power supply terminals, and reference level means coupled to the other of said detector output terminals and being effective to fix the potential of said other of said detector output terminals at a substantially constant level such that said synchronizing pulse portions drive said transistor to a point close to saturation.

2. In a television receiver circuit as defined in claim 1, variable gain amplifier means for supplying a modulated signal to said detector circuit to be demodulated by said detector circuit to produce said video signal, and automatic gain control means coupled to said emitter electrode and arranged to apply a control voltage to said variable gain amplifier means to maintain the amplitude of said video signal substantially constant.

3. The television receiver circuit is defined in claim 1 wherein said video detector circuit includes a load impedance connected between said pair of output terminals.

4. In a television receiver circuit for negative modulation signals including synchronizing pulse portions, a video driver circuit including a transistor having emitter, collector and base electrodes, an input and an output and operated as an emitter follower to present a relatively high impedance at said input and a relatively low impedance at said output, a video detector circuit including a device which has a unilateral conduction characteristic and a pair of output terminals, a DC power supply having a pair of terminals, means connecting said collector electrode to one of said power supply terminals, load impedance means connecting said emitter electrode to the other of said power supply terminals, means coupling one of said detector output terminals to said base electrode with a polarity such that said synchronizing pulse portions increase conduction of said transistor, and reference level means coupled to the other of said detector output terminals, said transistor and said device being so poled that both said transistor and said device are forward biased by said reference level means.

5. In a television receiver circuit as defined in claim 4, said video detector circuit including a transformer winding operative to supply a modulated signal thereto and a load impedance connected between said output terminals, said device connected in series with said transformer winding between said output terminals.

6. In a television receiver circuit as defined in claim 5, said device being connected to conduct in a direction such that base bias current of said transistor flows in parallel paths through said diode and through said load impedance.

7. In a television receiver circuit including a picture tube having an electron gun structure and deflection means and including a sound reproducer, a video driver stage having an input and an output, a video detector circuit coupled to said input, said driver stage including a transistor operated as an emitter-follower, a video output stage having an input coupled to said output of said driver stage and having an output coupled to said electron gun structure, contrast control means in the emitter circuit of said transistor, variable gain amplifier means for supplying a modulated signal to said detector circuit to be demodulated by said detector circuit to produce said video signal, automatic gain control means coupled to said output of said video driver stage and arranged to apply a control voltage to said variable gain amplifier means to maintain the amplitude of said video signal substantially constant, a sound IF amplifier having an input coupled to said output of said driver stage, a sound detector coupled to said sound IF amplifier, an audio amplifier coupled between said sound detector and said sound reproducer, synchronizing signal separator means coupled to said output of said video driver stage, and a deflection circuit coupled between said synchronizing signal separator circuit and said deflection means.

References Cited

UNITED STATES PATENTS 2,302,561 11/1942 Bingley ............ 178—7.3

OTHER REFERENCES

Towers: Transistor Television Receivers, pp. 55–75, 1963.

ROBERT L. GRIFFIN, *Primary Examiner.*

R. L. RICHARDSON, *Assistant Examiner.*

U.S. Cl. X.R.

331—20